(12) United States Patent
Rudi et al.

(10) Patent No.: US 7,528,320 B2
(45) Date of Patent: May 5, 2009

(54) JACKET FOR HEAT-INSULATED CONDUITS AND METHOD FOR MAKING SAME

(75) Inventors: Roberto Rudi, Schinznach-Dorf (CH); Anja Boli, Lenzerheide (CH)

(73) Assignee: Brugg Rohr AG, Holding, Brugg (CH)

( * ) Notice: Subject to any disclaimer, the term of this patent is extended or adjusted under 35 U.S.C. 154(b) by 126 days.

(21) Appl. No.: 11/717,452

(22) Filed: Mar. 12, 2007

(65) Prior Publication Data
US 2007/0227758 A1    Oct. 4, 2007

(30) Foreign Application Priority Data
Mar. 28, 2006   (DE)   ........................ 10 2006 014 235

(51) Int. Cl.
*H01B 7/00* (2006.01)
(52) U.S. Cl. ....................................... 174/36
(58) Field of Classification Search ............ 174/110 R, 174/110 FC, 110 F, 113 C
See application file for complete search history.

(56) References Cited

U.S. PATENT DOCUMENTS

| 4,104,481 | A | * | 8/1978 | Wilkenloh et al. ............ 174/28 |
| 4,166,890 | A | * | 9/1979 | Fried et al. ..................... 521/92 |
| 4,351,366 | A | * | 9/1982 | Angioletti ..................... 138/149 |
| 4,352,701 | A | * | 10/1982 | Shimba et al. ................. 156/51 |
| 4,576,666 | A | | 3/1986 | Harris et al. |
| 5,223,566 | A | * | 6/1993 | Aida et al. .................. 524/451 |
| 5,670,552 | A | | 9/1997 | Gusavage et al. |
| 5,939,464 | A | * | 8/1999 | Wang .......................... 521/139 |
| 5,994,420 | A | | 11/1999 | Gusavage et al. |
| 2001/0000930 | A1 | * | 5/2001 | Kim ........................... 264/1.24 |

FOREIGN PATENT DOCUMENTS

| AT | E 42710 B | 8/1984 |
| DE | 4137649 C2 | 11/1997 |
| DE | 19815046 A1 | 10/1999 |
| DE | 69616377 T2 | 7/2002 |
| DE | 69813958 T2 | 3/2004 |
| EP | 0721123 A1 | 7/1996 |
| EP | 0 897 788 B1 | 8/1997 |

* cited by examiner

*Primary Examiner*—William H Mayo, III
(74) *Attorney, Agent, or Firm*—Ware, Fressola, Van der Sluys & Adolphson LLP

(57) ABSTRACT

A jacket (3) for flexible heat-insulated conduits, in particular district heat transport lines, comprising a foamed or inflated polyethylene-based thermoplastic with a modulus of elasticity between 90 and 300 MPa and a density between 0.560 and 0.850 g/cm$^3$.

15 Claims, 1 Drawing Sheet

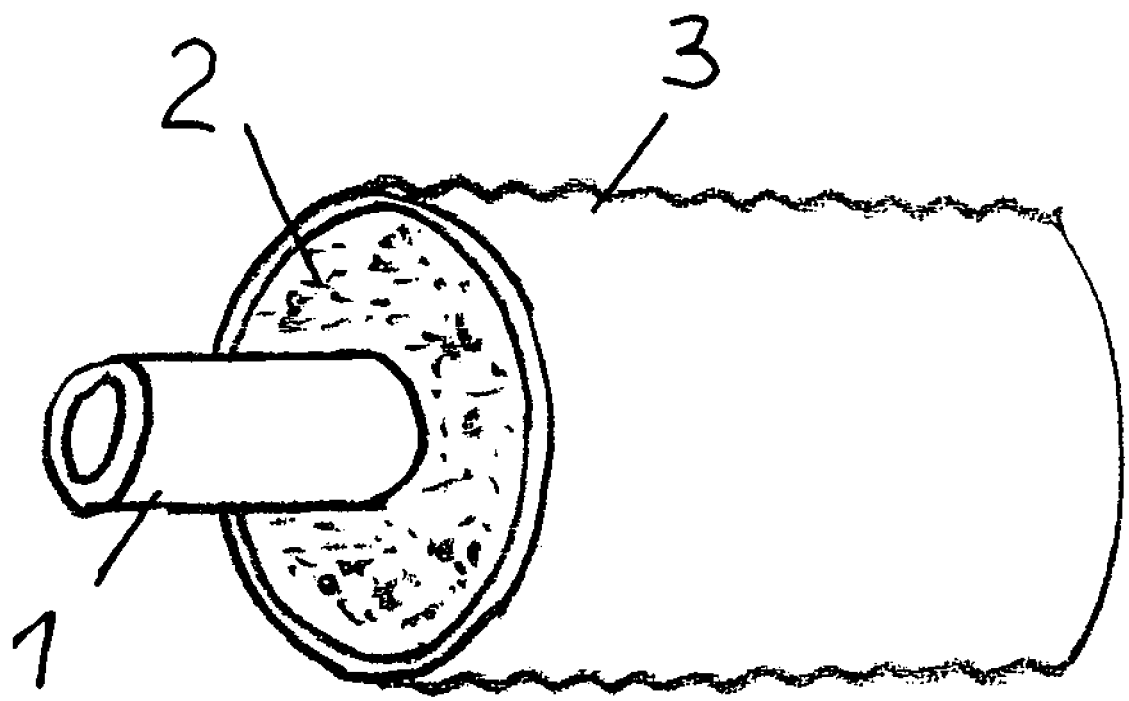

JACKET FOR HEAT-INSULATED CONDUITS AND METHOD FOR MAKING SAME

BACKGROUND OF THE INVENTION

1. Technical Field

The invention relates to a jacket for flexible heat-insulated conduits.

2. Description of the Background Art

EP 0 897 788 discloses a heat-insulated conduit that is made up of an internal tube, a heat-insulating layer based on polyurethane foam and surrounding the internal tube, and an external jacket. The known conduit can be manufactured in long lengths in one continuous working step. The external jacket, manufactured by extrusion, is made of polyethylene and has a corrugated surface.

One important field of application for the known conduit is the transport of district heat, in which context the conduit is installed in the ground.

The jacket of the conduit is exposed to considerable mechanical loads during both manufacture and installation. By being wound onto cable drums, the jacket is stressed by tensile and flexural forces. Upon installation in the ground, the jacket is stressed by frictional forces. These forces are handled by a conventional jacket made of polyethylene.

On the other hand, the good mechanical strength values of the jacket also result in greater stiffness of the conduit, so that the bending radius cannot fall below a certain value. The known conduit is transported to the utilization site either on commercially available cable drums or coiled into a ring. Large diameters for the cable drums on which the conduit is wound, or large-diameter rings, create problems upon transport to the installation site. A conduit having little flexibility proves disadvantageous during installation as well, since the conduit cannot be curved around tight radii.

SUMMARY OF THE INVENTION

The object of the present invention is therefore to improve the conduit of the kind mentioned initially in such a way that bendability or flexibility is enhanced without substantially degrading the mechanical properties of the jacket.

This object is achieved by providing a jacket for flexible heat-insulated conduits, in particular district heat transport lines, comprising a foamed or inflated polyethylene-based thermoplastic with a modulus of elasticity between 90 and 300 MPa and a density between 0.560 and 0.850 g/cm$^3$.

In addition to the advantages directly evident from the statement of the object, the invention yields the additional advantage that the conduit is lighter in weight than the known conduit. A considerable cost saving furthermore results due to economization of material, this saving increasing as the degree of foaming increases, i.e. as the proportion of cells in the jacket becomes greater.

Particularly suitable materials for the jacket are low density polyethylene (LDPE), linear low density polyethylene (LLDPE), and ethylene copolymers based on low density polyethylene.

The degree of foaming of the material for the jacket is preferably between 10 and 60%, i.e. 10 to 60% of the volume is made up of gas-filled cells. The cells are cells having a diameter of less than 0.5 mm.

For the manufacture of a jacket for a heat-insulated conduit, a method that has proven particularly advantageous is one in which a mixture of a polyethylene-based granulated material, and a granulated material based on polyethylene into which a propellant in the form of spherules has been mixed, is produced; this mixture is introduced into an extruder and melted therein, and the melt is extruded in the form of a tube; and the spherules foam up or inflate upon or after emergence from the extruder die.

In particular, the ratio between the polyethylene-based granulated material and the granulated material based on polyethylene to which spherules have been added is between 90:10 and 99:1. The advantage resulting therefrom is that the spherules can be precisely metered in, and the desired degree of foaming can thus be accurately adjusted. The spherules are advantageously hollow spheres that are filled with a gas.

The invention is explained in more detail with reference to the exemplifying embodiment depicted schematically in the FIGURE.

BRIEF DESCRIPTION OF THE DRAWING

The FIGURE is a perspective view of a heat-insulated conduit with a jacket embodying the present invention.

DETAILED DESCRIPTION OF THE INVENTION

In the FIGURE, an internal tube is labeled 1, a heat-insulating layer based on polyurethane foam is labeled 2, and a polyethylene-based external jacket is labeled 3.

The tube and the manufacturing method are known per se from EP 0 897 788 B1.

Instead of the single internal tube 1, as many as four internal tubes can be provided. The internal tube or tubes is/are preferably made of crosslinked polyethylene. Also provided between heat-insulating layer 2 and external jacket 3 is a film, not depicted in detail, that serves on the one hand as a mold for the polyurethane foam that develops during manufacture, and on the other hand also as a diffusion barrier layer to prevent the escape of the cell gas present in the cells of the polyurethane foam.

According to the teaching of the invention, external jacket 3 is made of a foamed polyethylene-based plastic. A low density polyethylene such as, for example, LDPE, VLDPE, and LLDPE is preferred. An LDPE-based copolymer can, however, also be used.

For manufacture of the external jacket, firstly 97 to 99 parts LDPE are made available in granulated form. One to three parts of a granulated plastic that contains a large proportion of hollow spherules made of plastic are then mixed into the granulated LDPE prior to introduction into the jacket extruder. However, the granulated plastic can also be introduced into the jacket extruder together with the granulated LDPE. In the jacket extruder, the granulated LDPE is increasingly heated and caused to melt. The granulated plastic is, in this context, intimately mixed with the granulated LDPE or LDPE melt. Upon emergence from the die of the jacket extruder, the gas present in the hollow spherules expands and inflates the LDPE melt. After the external jacket cools, it exhibits a cellular structure. The casing of the hollow spherules is retained; no connection occurs to the LDPE jacket material forming the matrix.

An external jacket according to the teaching of the invention exhibits the following values:

| | |
|---|---|
| Modulus of elasticity | 135-162 MPa |
| Density | 0.560-0.750 g/cm$^3$ |

The weight savings of the conduit according to the teaching of the invention with respect to the conduit according to EP 0 897 788 is approx. 3-15%, depending on the degree of foaming.

The flexibility of the conduit is 10-30% greater than in the case of a conduit having a conventional PE jacket, the flexibility also being determined by way of the energy expenditure necessary for bending to a defined radius.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

What is claimed is:

1. A flexible heat-insulated conduit comprising:
   (a) an internal tube;
   (b) an insulating layer surrounding the internal tube;
   (c) an outer jacket surrounding the insulating layer, the outer jacket provided by a foamed or inflated polyethylene-based thermoplastic with a modulus of elasticity between 90 and 300 MPa and a density between 0.560 and 0.850 g/cm$^3$.

2. The conduit according to claim 1, wherein the jacket is corrugated.

3. The conduit according to claim 2, wherein the thermoplastic is a low density polyethylene (LDPE).

4. The conduit according to claim 2, wherein the thermoplastic is a linear low density polyethylene (LLDPE).

5. The conduit according to claim 2, wherein the thermoplastic is a copolymer of ethylene.

6. The conduit according to claim 5, wherein the copolymer of ethylene is based on low density polyethylene.

7. The conduit according to claim 1, wherein the thermoplastic is a low density polyethylene (LDPE).

8. The conduit according to claim 1, wherein the thermoplastic is a linear low density polyethylene (LLDPE).

9. The conduit according to claim 1, wherein the thermoplastic is a copolymer of ethylene.

10. The conduit according to claim 9, wherein the copolymer of ethylene is based on low density polyethylene.

11. The conduit according to claim 1, wherein the foamed polyethylene-based thermoplastic has a degree of foaming between 10 and 60%.

12. The conduit according to claim 1, wherein the foamed polyethylene-based thermoplastic has cells with diameters between 0.1 mm and 0.5 mm.

13. A method for manufacturing a flexible heat-insulated conduit comprising the steps of:
    (a) providing an internal tube surrounded by an insulating layer;
    (b) producing a mixture of a polyethylene-based granulated material and a granulated material based on polyethylene into which a propellant has been mixed;
    (c) introducing the mixture into an extruder to produce a melt; and
    (d) extruding the melt through an extruder die to form a jacket over the insulating layer, the jacket being foamed up or inflated upon or after emergence from the extruder die.

14. The method according to claim 13, wherein the mixture of polyethylene-based granulated material and granulated material based on polyethylene into which a propellant has a ratio between 90:10 and 99:1.

15. The method according to claim 14, wherein the propellant in the granulated material is in the form of hollow spherules made of plastic.

* * * * *